United States Patent [19]

Hagen et al.

[11] Patent Number: 4,476,347

[45] Date of Patent: Oct. 9, 1984

[54] METHOD AND CIRCUIT ARRANGEMENT FOR TRANSMITTING COMMUNICATION SIGNALS BETWEEN SWITCHING CENTERS OF FIRST AND SECOND SWITCHING NETWORKS OPERATING WITH DIFFERENT TRANSMISSION PROCEDURES

[75] Inventors: Rolf Hagen, Unterhaching; Peter Weidner, Munich, both of Fed. Rep. of Germany

[73] Assignee: Siemens Aktiengesellschaft, Berlin & Munich, Fed. Rep. of Germany

[21] Appl. No.: 472,979

[22] Filed: Mar. 8, 1983

[30] Foreign Application Priority Data

Mar. 22, 1982 [DE] Fed. Rep. of Germany ....... 3210439

[51] Int. Cl.³ .................... H04L 3/00; H04L 23/00
[52] U.S. Cl. ...................................................... 178/3
[58] Field of Search .................. 178/3, 2 B, 26 R; 370/41

[56] References Cited

U.S. PATENT DOCUMENTS 4,122,299 10/1978 Cannon ............................. 178/2 B
4,323,728 4/1982 Bergman et al. ..................... 178/3

FOREIGN PATENT DOCUMENTS

79/0700 2/1980 South Africa .

OTHER PUBLICATIONS

F.T.A. van Bergen et al., "A Teletex-Telex Converter", Philips Telecommunication Review, vol. 39, No. 2, Jun. 1981, pp. 49–62.

Primary Examiner—Stafford D. Schreyer
Attorney, Agent or Firm—Hill, Van Santen, Steadman & Simpson

[57] ABSTRACT

A method and a circuit arrangement are provided for the transmission of communication signals over switching centers of a first switching network and of a second switching network operating with different transmission procedures. The transmission is executed with the assistance of a decentralized converter in which a fixed assignment between the transmission lines of the first switching network and the virtual channels to be employed on transmission lines of the second switching center for a signal transmission is defined. Of the signals to be transmitted, only the signal portions effecting the execution of network-dependent procedure divisions are converted in the converter. The data signals appearing in accordance with the network-independent procedure divisions are combined in unaltered form with the converted signal portions.

11 Claims, 6 Drawing Figures

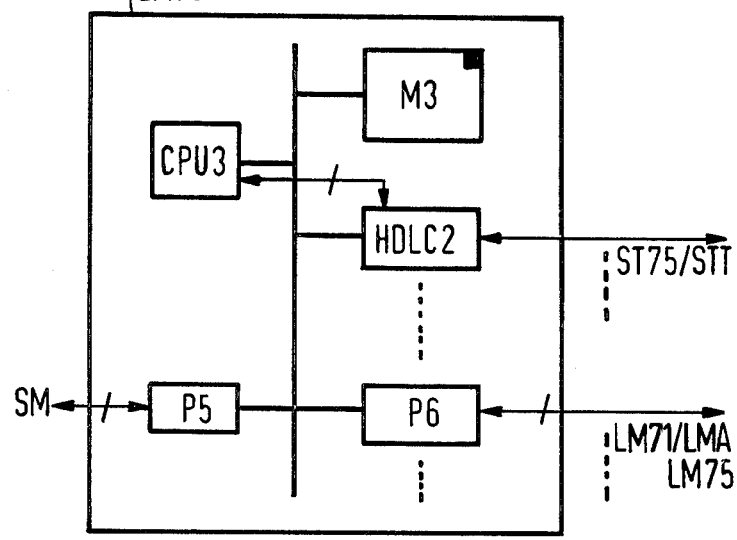
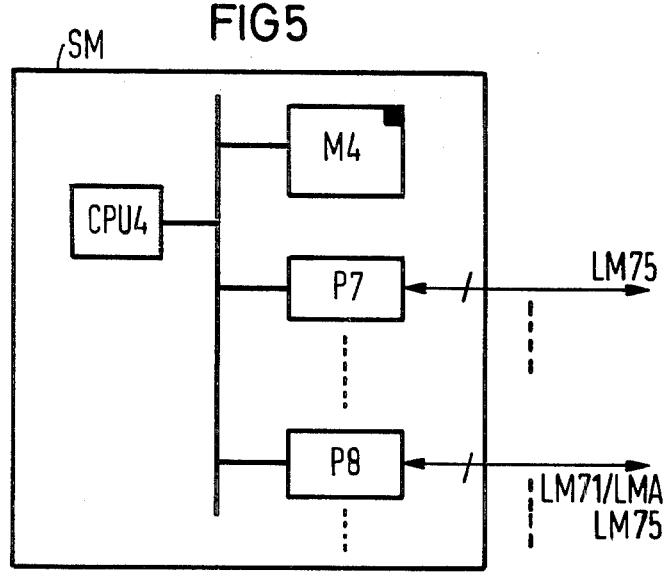

METHOD AND CIRCUIT ARRANGEMENT FOR TRANSMITTING COMMUNICATION SIGNALS BETWEEN SWITCHING CENTERS OF FIRST AND SECOND SWITCHING NETWORKS OPERATING WITH DIFFERENT TRANSMISSION PROCEDURES

BACKGROUND OF THE INVENTION

1. Field of the Invention

The present invention relates to a method and to a circuit arrangement for transmitting communication signals formed by data signals and/or signaling information between subscriber stations which are connected over switching centers of a first switching network operating with a first transmission procedure which, in particular, is formed by a line switching network or by a switching network enabling the transmission of communication signals in the form of packets, and a second switching network operating with a second transmission procedure differing from the first transmission procedure and enabling the transmission of the communication signals in the form of packets, whereby the transmission procedures of the switching networks participating in a connection are composed of network-independent procedure divisions containing the data signals and of the network-dependent procedure divisions at least containing the signaling information.

2. Description of the Prior Art

A circuit arrangement for transmitting digital signals over an exchange between transmission and/or receiving devices operating with different data transmission procedures and with different data formats is already known in the art, for example from U.S. Pat. No. 4,323,728, fully incorporated herein by this reference. The transmission of digital signals thereby occurs over a data switching center which is designed for handling different data transmission procedures and for the transmission of different data formats. Separate groups of termination circuits are provided for this purpose in the data switching center for the respective data transmission procedure and the respective data format. A conversion device is connected to the groups of termination circuits, the conversion device completely accepting the digital signals emitted by a termination circuit, intermediately storing said signals, and converting the signals in terms of data transmission procedure and data format and then emitting the converted signals to the respective termination circuit at the opposite side of the connection. This known circuit arrangement serves particularly for the transmission of digital signals between telex and teletex terminals.

In the transmission of digital signals over the converter device, there is no fixed connection between the terminals but, after the intermediate storage and conversion of the digital signals to be transmitted in the converter device, a plurality of communications with the terminals are required. Connected therewith, however, is a control expense in the converter device and in the connected data switching system which is, at times, not desired. In addition, it is not possible, given the converter device of the known circuit arrangement, to transmit communication signals between terminals which are connected to switching centers of a line switching network or a switching network enabling the transmission of communications signals in the form of packets and terminals connected to switching centers of a switching network enabling the transmission of communication signals in the form of packets, since the operation of such a converter device presumed that these converter devices would be equipped with corresponding packeting and de-packeting device which, in fact, however, is not the case. A further teletex/telex converter is also known from the publication "Philips Telecommunication Review", Vol. 39, No. 2, June 1981, which is fully incorporated herein by this reference. In this system, it is a matter of a converter which enables a transition from a line switching network into a packet switching network. However, executing a plurality of communications (a plurality of connection setup operations) between the terminals and the converter is also provided here in the transmission of digital signals between a telex terminal and a teletex terminal. Therefore, the disadvantage also arises in this system that considerable control operations are required within the converter or, respectively, within the exchange centers for the transmission of the digital signals.

SUMMARY OF THE INVENTION

The object of the present invention, therefore, is to provide a way to make due with a lower control expense than in the prior art in order to transmit digital signals between switching centers of a first switching network operating with different transmission procedures and a second switching network enabling the transmission of communications signals in the form of packets.

Given a method of the type initially mentioned above, the above object is achieved, according to the present invention, in that, with the assistance of a decentralized converter in which a fixed assignment is determined between the transmission lines of a first switching network and the virtual channels to be employed for a signal transmission on transmission lines of a second switching network, of the signals to be transmitted in the setup and takedown of a connection, as well as during the existence of a connection between the two different switching networks, only those signal portions effecting the execution of network-dependent procedure divisions in the respective switching network are converted into signal portions such as enable the execution of corresponding network-dependent procedure divisions in the respective other switching network. The data signals occurring in accordance with the network-independent procedure divisions are combined in unaltered form with the converted signal portions enabling the execution of network-dependent procedure divisions.

The present invention offers the advantage that, as a result of the fixed connection between transmission lines of a first switching network and the virtual channels to be employed on transmission lines of the second switching network, no control measures going beyond the conversion function are required within the converter. Moreover, due to the fact that only the signal portions effecting the execution of network-dependent procedure divisions are converted, a simplification occurs in the conversion of the digital signals to be transmitted.

It is advantageous for executing the method of the present invention to connect an exchange of the first switching network and an exchange of a second switching network to one another over a decentralized converter which is connected to the transmission lines of the exchange of the first switching network or, respectively, of the exchange of the second switching network by way of a respective first or second separate line termination module, whereby the first and second line termination modules connected to the transmission lines of the two exchanges and provided in the respective switching network for the execution of network-dependent procedure divisions are connected to one another and, moreover, to at least one control module which controls the conversion of signaling information supplied thereto over the line termination modules. The line termination modules are designed such that they respectively permit the termination of converted signaling information offered in response to selection by the control module and/or of signal portions converted therein for the execution of corresponding network-dependent procedure divisions with data signals supplied thereto and appearing in accordance with the network-independent procedure divisions. As a result of the modular structure of the converter, and in comparison to known circuit arrangements, the advantage arises that each of the line termination modules contained in the converter need only execute one of the transmission procedures. Deriving therefrom is the further advantage that matching to any desired transmission procedures or, respectively, to any desired transmission rates provided in the switching networks, becomes possible by way of simply interchanging line termination modules.

BRIEF DESCRIPTION OF THE DRAWINGS

Other objects, features and advantages of the invention, its organization, construction and mode of operation will be best understood from the following detailed description, taken in conjunction with the accompanying drawings, on which:

FIG. 4 is a block diagram showing a more detailed structure of a line termination module for connection to an exchange enabling the transmission of communication signals in the form of packets;

FIG. 5 is a block circuit diagram showing a more detailed structure of a control module.

DESCRIPTION OF THE PREFERRED EMBODIMENTS

Figure 1:
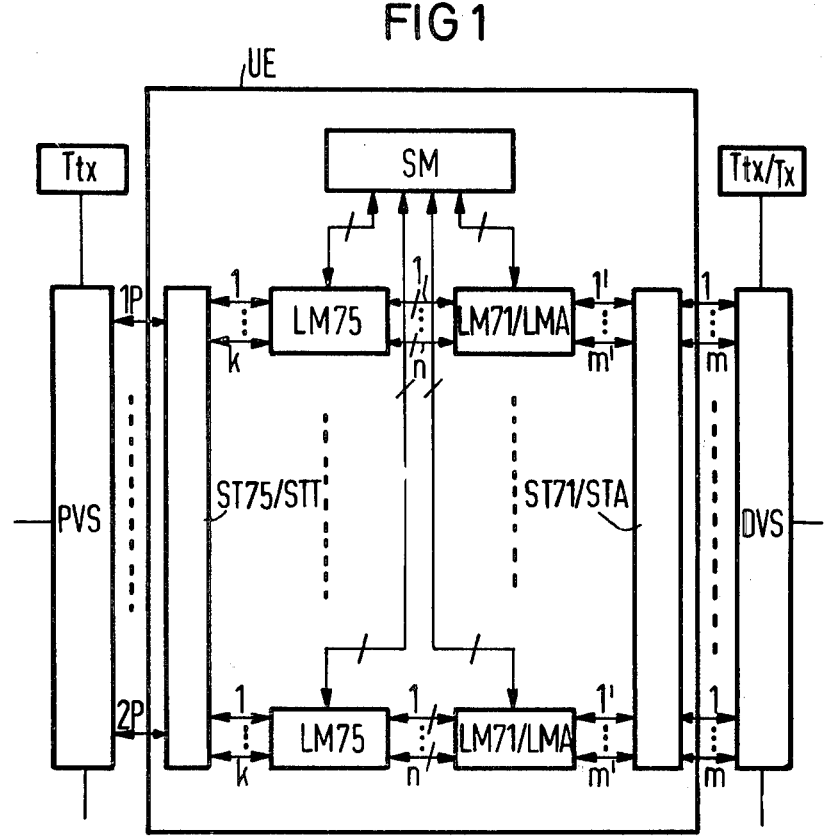
FIG. 1 is a block diagram of a circuit arrangement constructed in accordance with the present invention.

Referring to FIG. 1, a decentralized converter UE is connected over a plurality of transmission lines 1–m to a line switching center DVS of a line switching network and is connected by way of a plurality of transmission lines 1P and 2P to an exchange of a switching network PVS enabling the transmission of communication signals in the form of packets. The latter exchange network can be either a telephone network or a packet switching network. Assuming that the two switching centers are, for example, terminal exchanges to which telex and teletex terminals can be connected (referenced in FIG. 1 as Tx and Ttx). What is meant by terminals are the actual terminals and the data transmission devices connected thereto. The switching center, however, can also represent arbitrary intermediate exchanges of the switching networks. Assuming that the telex terminals, for example, emit their signals as start/stop characters according to the international telegraphy alphabet ITA No. 2 having 50 bit/s as a transmission rate, the teletex terminals, for example, transmit the signals as synchronous signals according to the international alphabet IA No. 5 having a data transmission rate of 2400 bit/s.

In the direction towards the line switching center DVS, the converter UE is connected to the transmission lines 1–m by way of an interface circuit ST71/STA. What is meant by the slash is that one of the two interface circuits is employed depending on the transmission method employed. An interface circuit ST71 is to be used when the line switching center is a switching center operating according to a synchronous method, a signaling procedure according to the CCITT recommendation X.71 being utilized on its transmission lines. Correspondingly, an interface circuit STA is to be used when the line switching center is a switching center operating according to an asynchronous -method, the A-signaling in accordance with the CCITT recommendations being utilized on its transmission lines. Within the converter UE, the respective interface circuit is connected to line termination modules LM71/LMA by way of a plurality of lines 1'–m'. The slash is again meant to indicate that a line termination module matched to the respective transmission method is connected to the interface circuit.

The converter UE is connected by way of an interface circuit ST75/STT to the transmission lines 1P, 2P of an exchange enabling the transmission of communication signals in the form of packets. It is assumed that a transmission procedure according to the CCITT recommendation X.75 is utilized on these transmission lines. An interface circuit ST75 or an interface circuit STT is provided depending upon whether the exchange PVS is a packet switching center or a switching center of a telephone network. Line termination modules LM75 are also connected to the interface circuit ST75/STT. The plurality of transmission lines 1P, 2P corresponds to the total number of lines extending from the line termination modules LM75 to the interface circuit ST75/STT. The line termination modules LM75 and LM71/LMA are connected to one another by way of a plurality of lines 1–n. The line termination modules are connected to a control module over bidirectionally operable control lines. The oblique stroke on the lines (FIG. 1) is meant to indicate that it is a matter of a respective plurality of individual lines. Such oblique strokes are also provided at other lines illustrated on the drawings in order to indicate the existence of a plurality of individual lines.

Figure 2:
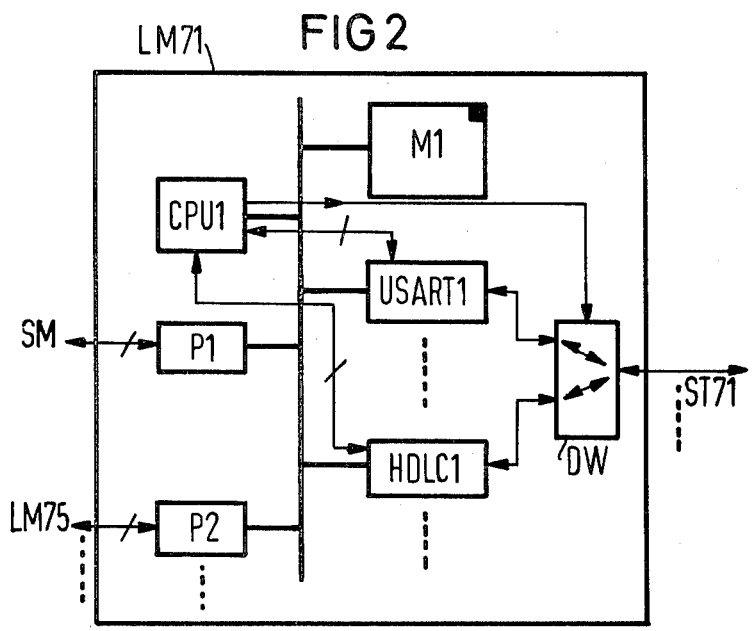
FIG. 2 is a block diagram showing a more detailed structure of a line termination module for connection to a line switching center operating in accordance with a synchronous method.

A possible structure of the line termination modules LM71 indicated in FIG. 1 is illustrated in FIG. 2. As already indicated, such line termination modules are employed when the converter UE is connected to a line switching center operating according to a synchronous method. The line termination module LM71 of FIG. 2 contains a processor CPU1 which is connected over a bus to a memory M1, to interface circuits P1, P2 and to transmission/receiving circuits USART1, HDLC1. The transmission/receiving circuits are controllable proceeding from the processor CPU1. The transmission/receiving circuits and the interface circuit P2 illustrated in the block diagram of FIG. 2 can be multiply provided independently of the plurality of transmission lines connected to the converter.

The transmission/receiving circuit USART1, referred to below as the signaling conversion circuit, serves for receiving and converting signaling information respectively supplied thereto at its input side. The transmission/receiving circuit HDLC1, referred to below as the data transmission circuit, operates only during the data signal transmission. The memory M1 contains read only memories and memories having random access. The interface circuits P1, P2 are connected over lines to the control module SM or, respectively, to a line termination module LM75 according to FIG. 1.

Figure 3:
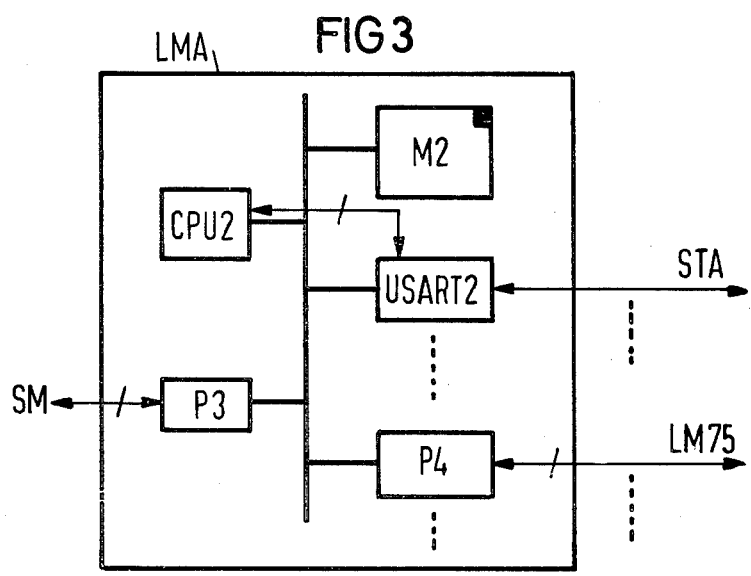
FIG. 3 is a block diagram showing a more detailed structure of a line termination module for connection to a line switching center operating according to an asynchronous method.

A possible structure of a line termination module LMA indicated in FIG. 1 is shown in a block diagram in FIG. 3. The line termination module referenced LMA in FIG. 3 comprises a processor CPU2 which is connected over a bus to a memory M2 containing a read only memory and memories having random access to interface circuits P3, P4 and to transmission/receiving circuits USART2 controllable proceeding from the processor CPU2. The transmission/receiving circuits USART2 which, like the interface circuit P4, are multiply provided depending on the plurality of transmission lines connected to a line termination module LMA, primarily serves series-parallel conversion or, respectively, parallel-series conversion of signals respectively supplied thereto at their input sides. The transmission/receiving circuits are connected to the interface circuit STA according to FIG. 1. The control module SM or, respectively, a line termination module LM75 according to FIG. 1, is connected to the interface circuits P3, P4, respectively.

A possible structure of the line termination modules LM75 indicated in FIG. 1 is shown in a block diagram in FIG. 4. The line termination module LM75 again contains a processor CPU3 which is connected over a bus to a memory M3 containing a read only memory and memories having random access, to interface circuits P5, P6 and to a transmission/receiving circuit HDLC2 (data transmission circuit) controllable proceeding from the processor CPU3. The transmission/receiving circuit HDLC2 is a data transmission circuit in which all signals to be transmitted to or from the transmission lines of the packet switching center PVS or the exchange of the telephone network are converted. The interface circuits P5, P6 are connected to the control module SM or, respectively, to a line termination module LM71 according to FIG. 1. The interface circuit P6 and the transmission/receiving circuit HDLC2 are multiply provided depending on the number of lines conducted to the appertaining line termination module.

Finally, a possible structure of the control module SM of FIG. 1 is illustrated in a block diagram in FIG. 5. According to FIG. 5, the control module SM again contains a processor CPU4 which is connected to a memory M4 comprising a read only memory and memories having random access and to interface circuits P7, P8 to which, moreover, the line termination modules LM75 and LM71/LMA are connected. The interface circuits can be multiply provided within the control module. The number of interface circuits thereby depends on the number of line termination modules.

With the structure of the circuit arrangements illustrated on the drawings having been set forth above, the manner of operation of the circuit arrangements is now considered. To this end, the general transmission principle is first discussed. Universally applicable transmission procedures are fixed for the users and for the operators of transmission paths for controlling the data transmission between terminals by way of so-called end-to-end protocols, on the one hand, and between the respective terminals and the exchanges lying in the transmission paths, on the other hand. A model which has become known as the ISO architecture model has been developed for these transmission procedures. This model provides a plurality of levels or planes for the data transmission, these being hierarchically constructed above one another. One therefore distinguishes between transmission-oriented, network-dependent and processing-oriented, network-independent levels. The transmission-oriented levels comprise the bit-wise transmission on the physical lines, a data protection on the transmission paths and the data exchange to be executed within the respective switching network given call set-up and given an existing connection. The higher, network-independent levels control the data exchange between the terminals. Specific procedure divisions, also referred to as protocols, are provided within the individual levels.

The network-dependent levels and the procedure divisions to be realized therein are fixed, for example, for the data exchange between teletex terminals over packet switching centers or telephone exchanges by the CCITT recommendations S.70 and X.75. Accordingly, given data transmission within a packet switching network or a telephone switching network, a transmission with a block-wise data protection (HDLC procedure) is, among other things, provided both in the call set-up as well as in the data transmission given an existing connection. The actual packets to be transmitted are transmitted in such a switching network within these blocks prescribed by the data protection. In the call set-up, therefore, a virtual connection is first produced over the exchanges lying in the transmission paths by way of specially-identified packets. After the connection set-up, virtual channels on the transmission lines are available for a virtual connection.

A synchronous envelope-wise transmission is provided in a line switching network operating according to a synchronous method. The transit exchange signaling to be executed between exchanges during the connection set up is governed by the CCITT recommendation X.71. Thereby, the protection of the signaling information to be transmitted is effected by means of parity bits contained in the signaling information and by means of chronologically monitoring the connection set up in the exchanges. Data protection proceeding beyond this is not provided in the connection set up. When the terminals participate in a connection are teletex terminals, then a data transmission protected by the HDLC procedure also occurs given an existing connection. The actual data signals to be exchanged between the terminals are transmitted within blocks prescribed by the HDLC procedure, the data signals, as already mentioned above, in turn, possibly containing higher signal portions effecting the execution of network-independent procedure divisions.

In a line switching network operating according to an asynchronous method, the transmission of data signals and signaling information occurs in the form of start-stop characters. When this line switching network is a telex network, then a connection set up between two exchanges can occur in accordance with A-signaling according to the CCITT recommendation U.1. The protection of the signaling information to be transmitted between the two exchanges is prescribed by the chronological sequence of the signaling information to be transmitted. The telex transmission procedure is applied for data transmission given an existing connection.

The transmission procedures to be realized in different switching networks having been compared to one another above in a short survey, the manner of operation of the converter UE is now discussed in greater detail. Reference is therefore made to FIG. 1 in combination with FIGS. 2-5. In a first exemplary embodiment, the converter UE is to serve the transmission of message signals formed by data signals and/or signaling information between teletex terminals which are connected over exchanges of a line switching network and of a packet switching network. In this exemplary embodiment, the converter UE contains an interface circuit ST71 and line termination modules LM71 in the direction towards the line switching center DVS. Proceeding from the line switching center, respectively four transmission lines designed for a data transmission rate of 2400 bit/s are conducted over the interface circuit to a line termination module LM71 (m=4 in FIG. 1). The individual line termination modules LM71 are connected by four lines to respectively one line termination module LM75 (n=4 in FIG. 1). Each line termination module LM75 is, in turn, connected over an interface circuit ST75 to a transmission line of the packet switching center PVS designed for a data transmission rate of 9.6 kbit/s (k=1 in FIG. 1). Permanently assigned within the line termination modules LM75 to the trunk lines which connect the line termination modules LM75 and LM71 are virtual channels to be employed on the transmission line of the packet switching network coming into consideration, i.e. respectively four virtual channels are available on the transmission lines 1P, 2P.

First considered is the case that a connection is set up from a teletex terminal Ttx connected to the line switching center DVS to a teletex terminal Ttx connected to the packet switching center PVS. The signaling information converted for this purpose in the line switching center DVS are forwarded to the converter UE in accordance with the afore-mentioned signaling procedure X.71. A level conversion and a check of the envelope synchronization on the basis of the supplied signaling information first occurs in the interface circuit ST71. The monitoring or, respectively, synchronization bits contained in the signaling information and serving for monitoring the envelope synchronization are subsequently removed and the remaining bits are forwarded to the line termination module LM71. The appertaining line termination module LM71 is situated in a defined initial state for the transmission lines carrying the appertaining signaling information and not yet seized, i.e. the appertaining signaling conversion circuit USART1 according to FIG. 2 is turned on by the appertaining processor CPU1. Moreover, the data selector DW is controlled by the processor CPU1 such that all received signaling information can proceed to the signaling conversion circuit USART1.

The signaling information received in this manner, in serial form, are converted into parallel characters in the signaling conversion circuit USART1 and are supplied to the processor CPU1 over a bus arrangement. The processor CPU1 is thereby instructed of the presence of such parallel characters by a control signal on the control line illustrated in FIG. 2. In response thereto, the processor CPU1 executes an evaluation of the parallel characters received over the bus arrangement, transfers signaling information to be transmitted to the teletex terminal Ttx connected to the line switching center DVS to the signaling conversion circuit USART1, if need be in reverse direction, the signaling information being forwarded by the signaling conversion circuit USART1, after conversion into a serial form, to the interface circuit ST71 for forwarding, and, on the basis of the evaluation of the received parallel characters, derives reports corresponding to the characters which are supplied over the interface circuit P1 to the control module SM. The selection sub-information contained in the signaling information in a connection set up are first intermediately stored by the processor CPU1 in a memory of the memory arrangement M1 which has random access until complete reception of the selection information. Given the existence of the complete selection information, the same are forwarded to the control module SM with a report provided for this purpose.

The reports forwarded in this manner by the line termination module LM71 are supplied to the processor CPU4 of the control module SM according to FIG. 5 over the interface circuit P8 and the appertaining bus arrangement. The processor CPU4 derives corresponding requests from the reports received in this manner and forwards the requests over the interface circuit P7 to the line termination module LM75 connected to the appertaining line termination module LM71. The selection information received proceeding from the line termination module LM71 are first intermediately stored in a memory of the memory arrangement M4 which has random access and are transferred with a separate request to the appertaining line termination module LM75.

The interface circuit P5 of the line termination module LM75 according to FIG. 4 receives the individual requests occurring in the connection set up and feeds the same to the processor CPU3 over the bus arrangement. The processor CPU3, in turn, derives corresponding signaling information matched to the packet switching network from such requests. The individual signaling information which are to be transmitted in the form of packets in this case are deposited in the memory arrangement M3. The processor CPU3, finally, identifies the virtual channel to be employed for the transmission on the transmission line 1P or, respectively, 2P, and forwards signaling information corresponding to the requests to the transmission/ reception circuit HDLC2 over the bus line arrangement. Signal portions serving for execution of the data protection procedure (HDLC procedure) are also thereby attached to the packets containing the signaling information, these being attached by the processor CPU3.

In the transmitting/receiving circuit HDLC2 just mentioned, additional signal portions serving for data protection are attached to the individual signaling information. The signaling information is edited in this manner in accordance with the (network-dependent) signaling procedure determinant in the packet switching network are forwarded by the transmitting/ receiving circuit HDLC2 to the interface circuit ST75 in serial form. The interface circuit ST75, finally, transmits the serial bit sequence over the transmission line of the packet switching network. Moreover, each signaling information transmitted in such a packet also contains information identifying the respective virtual channel to be employed. The signaling information to be transmitted, under certain conditions, in the aforementioned backward direction in this connection set up and coming from the packet switching center PVS are converted in a corresponding manner by the line termination modules LM75 or, respectively, LM71, under the control of the control module SM. Given a connection set up which was initiated by a teletex terminal of the packet switching network, the network-dependent conversion occurs in a manner corresponding to that previously explained. The virtual channel to be employed for the signal transmission towards the converter UE is to be determined by the packet switching center.

After execution of the overall signaling procedure, the line termination modules (LM75, LM71) participating in a connection are instructed by the control module SM concerning the data transmission status, such instruction being by way of corresponding request. In response thereto, the signaling-conversion circuit USART1 in the line termination module LM71 becomes passive and the data transmission circuit HDLC1 is turned on (FIG. 2). Moreover, the data selector DW is switched. As already mentioned above, data transmission protected blockwise is provided for teletex terminals which are connected to line switching centers only given an existing connection. The data blocks transmitted in serial form over transmission lines proceeding from the line switching center DVS, the data blocks now containing the data signals, are again accepted by the interface circuit ST71 contained in the converter UE according to FIG. 1 and are edited for further processing in the manner set forth above. The edited data blocks are subsequently transferred into the data transmission circuit HDLC1 according to FIG. 2. A check of the signal portions serving for data protection is carried out here, as is a conversion of the data blocks previously received serially into parallel characters. The parallel characters offered in this manner are subsequently supplied to the processor CPU1 over the appertaining bus arrangement. The processor CPU1 is instructed by the data transmission circuit HDLC1 concerning the presence of such a parallel character, this instruction being by way of a corresponding control signal on the control line provided for this purpose.

The processor CPU1 (FIG. 2) accepts the parallel character supplied thereto by the data transmission circuit HDLC1 and first executes a processing of the signal portions serving for data protection and not yet evaluated by the appertaining data transmission circuit HDLC1. Subsequently, it deposits the data signals contained in a data block (HDLC block) for intermediate storage in a region of the memory M1 which is provided for the purpose of intermediate storage. Thereby, for example, respectively 128 bytes are intermediately stored. Only these network-independent, intermediate stored data signals are subsequently forwarded over the interface circuit P2 coming into consideration to the appertaining line termination module LM75.

The latter line termination module LM75 (FIG. 4) accepts the data signals forwarded thereto block-wise over the interface circuit P6, this in turn transmitting the data signals over the appertaining bus arrangement to the processor CPU3. The processor CPU3 subsequently identifies the virtual channel to be employed on the appertaining transmission line 1P or, respectively, 2P, for the transmission to the exchange PVS and inserts the data signals supplied thereto by the line termination module LM71 into a corresponding packet. Signal portions serving for data protection are likewise additionally attached to such a packet. The data blocks deriving therefrom are subsequently forwarded to the appertaining transmitting/receiving circuit HDLC2 in the manner set forth above in conjunction with the connection setup.

Corresponding conversion operations are also executed when data signals are to be transmitted from teletex terminals Ttx connected to the packet switching center PVS to teletex terminals Ttx connected to the line switching center DVS. Thereby, only the data signals contained in a packet are likewise transmitted between the line termination modules LM75 and LM71. Separate signal portions for executing the data protection procedure (HDLC procedure) are then again attached to these data signals by the processor CPU1 (FIG. 2) and by the selected data transmission circuit HDLC1. This is followed by a parallel-to-serial conversion in the data transmission circuit HDLC1. Finally, monitoring bits serving for monitoring the envelope synchronization are also inserted into the now-existing serial bit sequence at periodic intervals before being forwarded, these being inserted in the interface circuit ST71 (FIG. 1) following the data transmission circuit HDLC1.

A second exemplary embodiment of the converter UE according to FIG. 1 relates to its connection to a packet switching center, on the one hand, and to a line switching center operating according to an asynchronous method, on the other hand. To this end, the line termination modules LM71 in the converter UE are replaced by line termination modules LMA (FIG. 3) and the interface circuit ST71 is replaced by an interface circuit STA. Possible, for example, with such a converter UE is a communication signal exchange between telex terminals connected to the appertaining line switching center DVS and teletex terminals connected to the packet switching center PVS. Since, as already explained above, no special data protection is to be carried out in a telex transmission, each line termination module LMA contains no special data transmission circuits serving data transmission; it only exhibits transmitting/receiving circuits USART2. In both the connection setup/connection cleardown as well as the data transmission, these transmitting/receiving circuit serve the purpose of serial-to-parallel conversion or, respectively, parallel-to-serial conversion and for monitoring or, respectively, for inserting the start and stop bits. Processing of the data signals to be transmitted over the converter UE which proceeds beyond this is carried out only by the processor CPU2 according to FIG. 3.

In this exemplary embodiment, the interface circuit STA only serves the purpose of level conversion. Since the transmission lines employed for a telex transmission are operated at a significantly lower transmission rate, a total of 64 transmission lines are connectible to a line termination module LMA given, for example, a transmission rate of 50 bit/s (m=64 in FIG. 1). As in the first exemplary embodiment, a line termination module LMA is connected to an appertaining line termination module LM75 over four lines (n=4 in FIG. 1). The latter line termination module is again connected to a transmission line of the packet switching center designed for a transmission rate of 9.6 kbit/s (k=1 in FIG. 1). The conversion operations within the present converter UE correspond to the conversion operations within the converter UE of the first exemplary embodiment, with the sole difference that the acceptance and transmission of data signals and signaling information occurs exclusively over the transmitting/receiving circuits USART2.

A third exemplary embodiment of the converter UE allows communication signal exchange between teletex terminals connected to a line switching center DVS operating according to a synchronous method and teletex terminals connected to a telephone exchange PVS. The transmission of the communication signals from or, respectively, to the teletex terminals thereby occurs with a data transmission rate of 2400 bit/s. The line termination modules LM71 of the converter UE, in this case, are connected over four lines to the line switching center DVS operating according to a synchronous method (m=4 in FIG. 1). The line termination modules LM71 and the appertaining line termination modules LM75 are connected to one another over four lines (n=4 in FIG. 1). The latter line termination modules are also connected over four lines (k=4 in FIG. 1) to the interface circuit STT. Deviating from the first exemplary embodiment, only one respective virtual channel is available for the transmission of communication signals over these lines. The transmission of the communication signals thereby occurs with a data transmission rate of 2400 bit/s. The previously-cited interface circuit STT in the exemplary embodiment discussed here only serves for matching the level of the converter UE to the telephone exchange PVS.

During transmission of communication signals, conversion operations corresponding to the conversion operations within the converter UE of a first exemplary embodiment are executed in the present converter UE. In contrast to the first exemplary embodiment of the converter UE, deviations only occur in the connection of the present converter UE to the telephone exchange PVS. As already mentioned, a single virtual channel is available here for the transmission of communication signals to or from the telephone exchange for each transmission line permanently connected to the telephone exchange. Both the signaling information in a connection setup/connection cleardown and the data signals to be transmitted given an existing connection are transmitted on these transmission lines in the form of packets according to the CCITT recommendation X.75.

Given a connection setup proceeding from the line switching center just considered, the signaling information transmitted from the converter UE to the telephone exchange in the form of packets are first converted in the telephone exchange into analog signals standard in telephone exchange networks. In the other case, i.e. given a connection setup proceeding from the telephone exchange, the telephone switching center converts the analog signaling information into digital signals which are then transmittable to the appertaining converter UE in the form of packets. For the purpose of executing the conversion operations, a corresponding converter is provided within the telephone switching center. Given an existing connection, the communication signals to be transmitted over the telephone switching center are forwarded only in the form of packets according to the CCITT recommendation X.75, i.e. no additional conversion of the communication signals to be transmitted occurs in this case in the telephone switching center.

Finally, a fourth exemplary embodiment of the converter UE enables exchange of communication signals between teletex terminals connected to a telephone switching center and teletex terminals connected to a packet switching center. To this end, the line termination modules LM71/LMA in the converter UE according to FIG. 1 are replaced by line termination modules LM75 and the interface circuit ST71/STA is replaced by an interface circuit STT. The line termination modules LM75 are respectively connected to the telephone switching center over four lines (m=1 in FIG. 1). A respective virtual channel is available on these lines for the transmission of communication signals. The transmission of the communication signals thereby occurs with a data transmission rate of 2400 bit/s.

The line termination modules LM75 are also connected over, respectively, four lines to further line termination modules LM75 (n=4 in FIG. 1) which are, in turn, connected with, respectively, one line over the interface circuit ST75 to the packet switching center (k=1 in FIG. 1). Four virtual channels are available for the transmission of the communication signals on the latter line. The transmission of the communication signals thereby occurs with the data transmission rate of 9600 bit/s.

The conversion operations of the present converter UE for the transmission of communication signals from or, respectively, to the packet switching center correspond to the conversion operations of the first exemplary embodiment required for the packet switching network. The conversion operations for the transmission of communication signals from or, respectively, to the telephone switching center correspond to the conversion operations of the third exemplary embodiment required for the telephone switching network.

Concerning the control module SM, it should also be pointed out here that, in addition to the conversion of the signaling information, the control module SM can also execute service and display functions (error check routines, error display, busy indication).

Commercially available modules can be employed for the circuit portions contained in the line termination modules LM71, LMA, LM75 and in the control module SM. Microprocessors of the type 8085A manufactured by the Intel Company can be employed as the processors CPU1-CPU4. The transmitting/ receiving circuits USART1 and USART2 can be formed by components manufactured by the Intel Company and designated 8251A. Also, components manufactured by the Intel Company and designated 8273 can be employed for the data transmission circuits HDLC1 and HDLC2. The data selector can be a traditional multiplexer circuit as is known, for example, under the designation SN74151. The read only memory and the memories having random access of the memory arrangements M1-M4 can be formed by components manufactured by the Intel Company under the designations 2732 or, respectively, 2185. The interface circuits P1-P8, finally, can be formed by components of the Intel Company having the designation 8255.

For the aforementioned removal of the synchronization bits serving for envelope synchronization from the signaling information or data blocks supplied over the transmission lines to the interface circuit ST71 or, respectively, for the insertion of the synchronization bits into the signaling information or data blocks to be emitted to the transmission lines, the interface circuit ST71 can, for example, contain shift registers. Thereby, as already disclosed in the South African Letters Patent No. 79/0700, fully incorporated herein by this reference, one can proceed in such a manner that those register locations of the shift registers accepting the signals from the transmission lines can remain out of consideration for a bit forwarding when the synchronization bits are contained therein. Given the shift registers provided for emitting signals to the transmission lines, one can proceed in such a manner that these contain the respective, additional synchronization bits to be emitted, these being contained in additional register stages.

Figure 6:
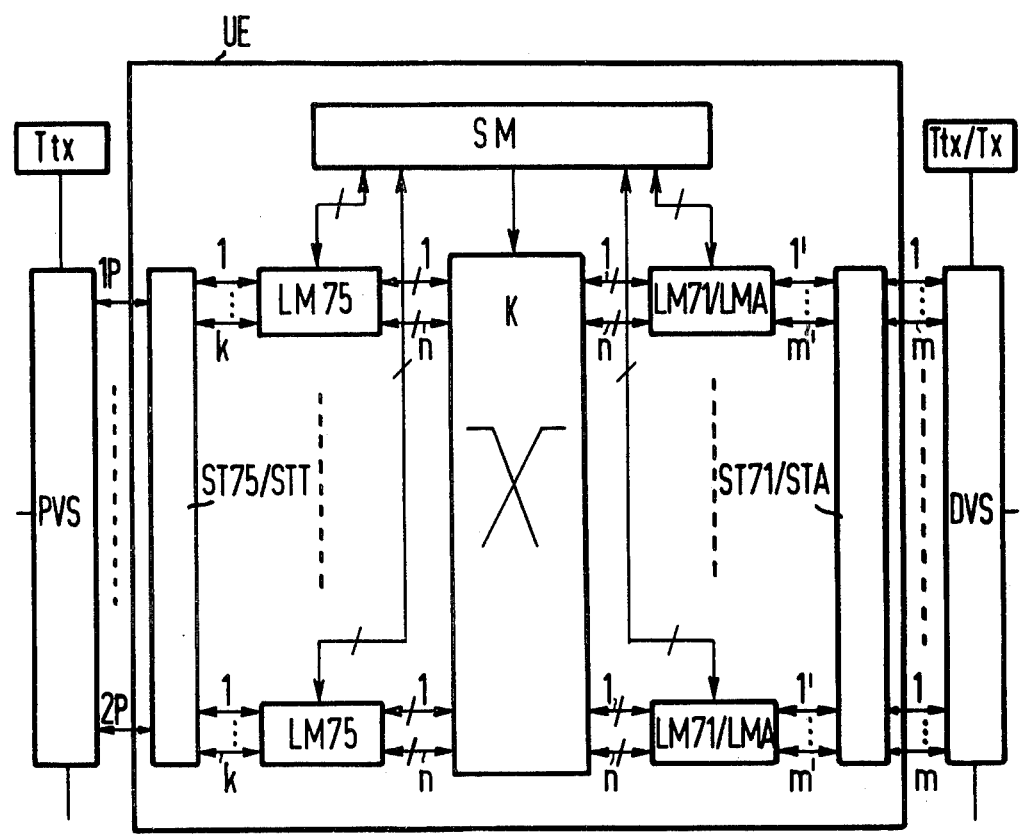
FIG. 6 is a block diagram showing a switching matrix network controlled by a control module of the type illustrated in FIG. 5.

In conclusion, it should be pointed out that, given a connection of the converter UE to a packet switching center, a plurality of the line termination modules LM75 can be replaced by a line termination module provided for connection to a transmission line designed with a higher transmission rate. Therefore, for example, it is possible to replace five line termination modules LM75 which are respectively connectible to a transmission line designed for a transmission with a transmission rate of 9.6 kbit/s with a single line termination module LM75 which is connectible to a transmission line of the packet switching network designed for a transmission rate of 48 kbit/s. When a plurality of line termination modules LM71 or, respectively LMA, (LM75 given connection to a telephone switching center) and a plurality of line termination modules LM75 provided for connection to a packet switching center or to a telephone switching center are to be connected to one another, then, as illustrated in FIG. 6, a switching matrix network K controlled by a control module SM can be employed instead of the individual lines employed in the above-discussed exemplary embodiments.

Finally, devices which permit direct memory access to the memories of the memory arrangements M1-M4 having random access can be employed instead of the interface circuits P1-P8.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for transmitting communication signals formed by data signals and signaling information between subscriber stations which are connected via switching centers of a first switching network, including a line switching network which operates in accordance with a first transmission procedure and a second switching network including a packet switching network which operates in accordance with a second transmission procedure which is different from the first transmission procedure, and in which the two different transmission procedures are composed of network-independent procedure divisions containing the data signals and network dependent procedure divisions containing at least the signaling information, the improvement therein comprising the steps of:
   assigning transmission lines of the first switching network to virtual channels of the second switching network;
   converting only those signal portions from one of the first and second switching networks effecting the execution of the network-dependent procedure divisions into signal portions which enable corresponding network-dependent procedure divisions in the other of the switching networks; and
   combining the data signals in accordance with the network-independent procedure divisions in unaltered form with the converted signal portions for use by the other switching network.

2. A circuit arrangement for transmitting communication signals formed by data signals and signaling information between subscriber stations which are served by respective switching networks which operate in accordance with different transmission procedures, comprising:
   first and second subscriber stations;
   first and second switching networks respectively connectible
   to said first and second subscriber stations, said first switching network comprising a line switching network operable in accordance with a first transmission procedure and said second switching network comprising a packet switching network operable in accordance with a different second transmission procedure, the transmission procedures comprising network-independent divisions containing the data signals and network-dependent divisions containing at least the signaling information, each of said switching networks respectively including first transmission lines and second transmission lines, said second transmission lines comprising virtual channels for signal transmission; and
   a decentralized converter connected between said first transmission lines and said second transmission lines and providing a fixed assignment between said first transmission lines and said virtual channels,
   for the signals to be transmitted between said switching networks during setup, cleardown and the existence of a connection between said subscriber stations said converter comprises conversion means for converting only those signals effecting network-dependent procedure divisions from one switching network into signals for effecting corresponding network-dependent procedure divisions in the other switching network, and combining means connected to said conversion means for combining the unaltered data signals and the converted signals for transmission to the other switching network.

3. The circuit arrangement of claim 2, wherein said decentralized converter comprises:
   a plurality of first line termination circuits respectively connected to a plurality of said first transmission lines for carrying interexchange signals;
   a plurality of second line termination circuits respectively connected between a first line termination circuit and at least one second transmission line for carrying interexchange signals;
   said first and second line termination circuits comprising said conversion means and said combining means; and
   control means connected to said line termination circuits and operable to control the conversion, combining and transmission of signals.

4. The circuit arrangement of claim 3, and further comprising:
   a switching matrix connected between said pluralities of first and second line termination circuits and connected to and controlled by said control means to selectively interconnect said line termination circuits.

5. The circuit arrangement of claim 3, wherein:

said first and second line termination circuits are fixedly connected together.

6. The circuit arrangement of claim 3, wherein:
said first transmission lines are synchronous transmission lines; and
each of said first line termination circuits comprises
   a plurality of interface circuits respectively connected to said control means and to the corresponding second line termination circuit,
   a plurality of transmitting/receiving circuits connectible to the respective ones of said first transmission lines, including a signal converter for receiving converting and emitting converted signal information and a data circuit for receiving and emitting data signals,
   a control circuit for controlling the execution of the transmission procedures to be carried out over the respective first transmission lines, and
   a bus interconnecting said control circuit, said transmitting/receiving circuits and said interface circuits.

7. The circuit arrangement of claim 6, wherein: each of said first line termination circuits comprises:
   a selector interposed between said transmitting/receiving circuits and said bus and connected to and operated by said control circuit to selectively connect said transmitting/receiving circuits said respective ones of said first transmission lines.

8. The circuit arrangement of claim 3, wherein:
said first transmission lines are asynchronous transmission lines; and
each of said first line termination circuits comprises
   a plurality of transmitting/receiving circuits each connected to a respective plurality of said first transmission lines and each operable to provide parallel/series and series/parallel conversion,
   a plurality of interface circuits connected to said control means and to the respective second line terminating circuit,
   a bus connected to said transmitting/receiving circuits and to said interface circuits, and
   a control circuit connected to said bus and operable to control said interface circuits and said transmitting/receiving circuits to control the execution of the transmission procedures to be carried out on said first transmission lines.

9. The circuit arrangement of claim 3, wherein each of said first and/or second line termination circuits comprises:
   a plurality of interface circuits respectively connected to said control means and to the respective second or first line termination circuit;
   at least one transmitting/receiving circuit connected to respective first or second transmission lines;
   a bus interconnecting said interface and transmitting receiving circuits; and
   a control circuit connected to said bus and operable to control said transmitting/receiving and interface circuits to control the execution of the transmission procedures in the virtual channels of said first or second transmission lines to enable transmission in the form of packets.

10. The circuit arrangement of claim 3, wherein said control means comprises:
   a control circuit operable to control setup of a connection; and
   interface circuits connected to said first and second line transmission circuits and to said control circuit for receiving and reporting incoming signals from said termination circuits to operate said control circuit and ordering transmission of signals from said line termination circuits under the control of said control circuit.

11. The circuit arrangement of claim 3, wherein:
said control means and said first and second line termination circuits each comprise a microprocessor and a memory connected to said microprocessor and storing an operational program.

* * * * *